(12) United States Patent
Schwartz et al.

(10) Patent No.: US 9,701,294 B2
(45) Date of Patent: Jul. 11, 2017

(54) PULL STYLE DOUBLE DIAPHRAGM SPRING BRAKE ACTUATOR

(71) Applicant: Bendix Spicer Foundation Brake LLC, Elyria, OH (US)

(72) Inventors: Matthew James Schwartz, Byron Center, MI (US); Will Roberts, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/835,206

(22) Filed: Aug. 25, 2015

(65) Prior Publication Data

US 2017/0057480 A1    Mar. 2, 2017

(51) Int. Cl.
| | |
|---|---|
| *B60T 17/08* | (2006.01) |
| *B60T 13/58* | (2006.01) |
| *B60T 13/38* | (2006.01) |
| *B60T 13/36* | (2006.01) |

(52) U.S. Cl.
CPC .......... *B60T 13/588* (2013.01); *B60T 13/36* (2013.01); *B60T 13/38* (2013.01)

(58) Field of Classification Search
CPC .... B60T 17/083; B60T 17/074; B60T 17/086; B60T 17/088; B60T 17/08; B60T 17/0885
USPC .............................. 188/170, 153 D; 92/130 A
See application file for complete search history.

(56) References Cited

U.S. PATENT DOCUMENTS

| | | | | |
|---|---|---|---|---|
| 2,757,763 | A | * | 8/1956 | Burger .................. B60T 17/083 188/106 R |
| 3,020,094 | A | * | 2/1962 | Murty .................... B60T 1/067 188/170 |
| 3,095,067 | A | * | 6/1963 | Murty .................... B60T 13/10 188/170 |

(Continued)

OTHER PUBLICATIONS

International Search Report (PCT/ISA/220 & PCT/ISA/210) issued in PCT Application No. PCT/US2016/048131 dated Nov. 1, 2016 (four pages).

(Continued)

*Primary Examiner* — Bradley King
(74) *Attorney, Agent, or Firm* — Crowell & Moring LLP

(57) ABSTRACT

A spring-type brake actuator for a vehicle brake such as a pneumatically-actuated brake is provided, in which the actuator's operating rod is pulled toward the actuator to apply the brake. The actuator's parking brake release piston is located closer to the brake than the service brake piston, and the parking brake power spring is positioned between the mounting end of the actuator and the parking brake piston such that when parking brake release pressure is removed from the parking brake release chamber the parking brake piston biases the operating rod in the brake application direction, drawing the operating rod further into the actuator. The operating rod may penetrate the parking brake piston and an intermediate flange between the parking brake piston and the service brake piston, and be connected to the service brake piston such that the service brake piston may control brake application when the parking brake piston is in its parking brake release position adjacent to the end of the actuator that is mounted to the brake.

7 Claims, 4 Drawing Sheets

(56) References Cited

U.S. PATENT DOCUMENTS

| | | | | |
|---|---|---|---|---|
| 3,977,308 | A * | 8/1976 | Swander, Jr. | B60T 17/083 |
| | | | | 92/130 A |
| 4,364,305 | A * | 12/1982 | Dalibout | B60T 17/083 |
| | | | | 188/170 |
| 4,480,531 | A * | 11/1984 | Mylius | B60T 17/086 |
| | | | | 92/129 |
| 4,493,246 | A | 1/1985 | Dalibout | |
| 4,552,056 | A * | 11/1985 | McKay | B60T 17/086 |
| | | | | 188/170 |
| 4,589,704 | A | 5/1986 | Graham | |
| 5,033,592 | A | 7/1991 | Metzelfeld | |
| 5,787,794 | A | 8/1998 | Plantan et al. | |
| 5,816,371 | A | 10/1998 | Buckley et al. | |
| 6,267,455 | B1 * | 7/2001 | Graham | B60T 13/261 |
| | | | | 303/85 |
| 6,491,141 | B1 * | 12/2002 | Severinsson | B60T 17/083 |
| | | | | 188/170 |
| 6,694,866 | B2 | 2/2004 | Smith et al. | |
| 7,493,994 | B2 | 2/2009 | Plantan et al. | |
| 7,523,999 | B2 | 4/2009 | Iraschko | |
| 8,851,243 | B2 | 10/2014 | Prescott et al. | |
| 2010/0007202 | A1 | 1/2010 | Hemery et al. | |
| 2013/0075206 | A1 | 3/2013 | Plantan et al. | |
| 2013/0075211 | A1 | 3/2013 | Plantan et al. | |
| 2013/0075212 | A1 | 3/2013 | Darner et al. | |
| 2014/0096677 | A1 | 4/2014 | Gaufin | |

OTHER PUBLICATIONS

Written Opinion (PCT/ISA/237) issued in PCT Application No. PCT/US2016/048131 dated Nov. 1, 2016 (five pages).

\* cited by examiner

PULL STYLE DOUBLE DIAPHRAGM SPRING BRAKE ACTUATOR

BACKGROUND AND SUMMARY OF THE INVENTION

The present invention relates to a spring-type brake actuator for a vehicle braking system, and in particular to a spring brake actuator configured to apply a vehicle brake using tension force rather than compression force.

It is well known to employ so-called "spring brake" actuators to provide service brake, parking bake and emergency brake functions on vehicles such as commercial trucks (such as tractors, trailers, busses and box trucks) equipped with lever-operated drum or disc brakes. Spring brake actuators are typically pneumatically operated and supplied with operating air from a compressed air source on the vehicle. These actuators also typically are arranged so that their brake operating rod extends outward from the actuator to apply the brake to which they are connected, and arranged in a "fail-safe" manner, i.e., where the actuator defaults to a brake application state upon loss of operating air pressure.

An example prior art spring brake actuator is shown in cross-section view in FIG. 1. Actuator housing 1 includes a rear cylinder 2 in which a rear piston 3 is displaceably arranged. The inner wall of the rear cylinder and a chamber-side of the rear piston define a rear ventilation chamber 4. The other side of the rear piston bears on a brake actuator spring 5. This spring is also known in the art as a "power spring" or a "parking brake spring," and these terms may be used interchangeably.

The rear ventilation chamber is isolated from the spring side of piston 3 by an annular seal 6. An intermediate flange 8 (also known as a "wall") separates rear cylinder 2 from a front cylinder 9. The intermediate flange 8 traversed by a seal 10 through which passes a parking brake application rod 11, formed as an extension of rear piston 3. The parking brake application rod 11 can be displaced in the intermediate flange 8 by the rear piston. A front ventilation chamber 7 within front cylinder 9 is delimited by the cylinder inner wall and a front piston 13 and annular diaphragm 14. The rear piston 3 and the front piston 13 are in non-coupled contact with one another by means of the parking brake application rod 11, such that the front piston 13 can be displaced in a brake application direction by the rear piston 3 and/or by the application of pneumatic pressure in front ventilation chamber 7. An actuating rod 15 for actuating a brake lever of a vehicle brake is provided on the front side of the front piston 13.

FIG. 1 also shows mounting studs 16 provided for mounting of the actuator 1 on the vehicle brake, as well as a light return spring 18 which biases front piston 13 toward the rear of front chamber 7.

When no pneumatic pressure is present in the FIG. 1 actuator unit, the brake actuation spring 5 applies a high spring force to rear piston 3, which in turn applies this force via parking brake application rod 11 to front piston 13 to cause the actuator rod 15 to apply the vehicle brake. In this state, the vehicle brake functions as a parking brake, preventing vehicle movement.

When release of the parking brake is desired, the rear ventilation chamber 4 is filled with compressed air via a ventilation port (not illustrated). As the force generated by the increasing air pressure on the front side of rear piston 3 exceeds the force generated by brake application spring 5 (aka "power spring"), the rear piston 3 and parking brake application rod 11 move toward the rear of the rear cylinder 2, compressing spring 5 and causing air in the rear of rear cylinder 2 to be vented to atmosphere through passages in rear piston 3 (not illustrated) to vent path 19.

As parking brake application rod 11 moves towards the rear, the force previously applied to front piston 13 is relieved, and the return spring 18 biases the front piston 13 toward the rear of front cylinder 9, thereby withdrawing actuating rod 15 away from and releasing the vehicle brake. The vehicle therefore moves from a state in which it is braked by the brake actuator spring 5, to a non-braked state in which the vehicle may be moved. The vehicle brake is applied as a service during normal operation by admitting compressed air into the front ventilation chamber 7 (via a port not shown in FIG. 1). Because air pressure in rear ventilation chamber 4 continues to hold parking brake application rod 11 at the rear of the rear cylinder 2, the front piston 13 and actuating rod 15 are free to move forward and backward within the front cylinder as necessary to respond to the operator's brake actuation demands.

As can be seen for example in FIG. 1, the prior art push-type spring brake actuators typically have a relatively large portion of their mass suspended a considerable distance from the brake caliper mounting flange. The location of the center of gravity (CG) of the actuator creates a large moment about the mounting flange, requiring a robust structure at the brake-end of the actuator in order to ensure the actuator can withstand the vibrations and other forces applied to the actuator over its life, including being robust enough to avoid structural failure from fatigue. The additional material required to form an adequately robust actuator also increases costs and the space required by the actuator, a scarce resource in the cramped region around the end of an axle, particularly a steering axle.

The present invention addresses these and other problems in the prior art with a spring brake actuator that minimizes installation space requirements, materials use and costs with a pull-type double diaphragm spring brake actuator. This invention further requires little or no modification of existing lever-actuated brake designs. For example, the inventive actuator may be used with an existing drum brake by merely reversing the brake's so-called "S-cam" brake shoe actuator so that the brake's operating lever that rotates the S-cam can be used in a pull-type vs. push-type manner. Alternatively, the inventive pull-type actuator may be mounted on the opposite side of an existing brake's operating lever in a pull-type arrangement without the need for any modifications to the brake itself.

In one embodiment of the present invention the center of mass of the pull-type spring brake actuator is positioned closer to its mounting flange, in part due to the location of the relatively heavy power spring immediately adjacent to the mounting flange. In this embodiment the parking brake piston is located closer to the brake lever end of the actuator than the service brake piston, and the parking brake is applied by moving the parking brake piston away from the brake lever under the influence of the expanding power spring, pulling the brake application operating rod with the piston. The parking brake is released by application of fluid pressure (such as pneumatic pressure) to a chamber on a side of the parking brake piston opposite the power spring side of the piston.

Once the parking brake is released, a separate chamber containing the service brake piston located on the side of the parking brake chamber opposite the actuator mounting flange may be pressurized to pull the brake application rod into the actuator to applied the brake during normal vehicle operation. The operating rod is provided with a flange member in the portion of the rod in the parking brake chamber which cooperates with the parking brake piston to allow the operating rod to pass through parking brake piston when the parking brake is released, and to be engaged by the parking brake piston when the power spring biases the parking brake piston in the brake application direction.

The arrangements of the present invention permit the use of lighter, less costly components. For example, the brake application operating rod may have a smaller diameter (potentially as small as ¼") because it is only loaded in tension, eliminating compressive buckling concerns. Similarly, the parking brake portion of the actuator housing may be made thinner than in a push-type spring brake actuator because the end wall portion will be supported by the actuator mounting flange to which the actuator is bolted. Further, because the mounting studs are adjacent to the power spring and the end wall at the mounting flange, reinforcement of the end wall in the region of the mounting studs may be unnecessary. In addition, an intermediate flange between the parking brake chamber and the service brake chamber may be made lighter, as at least the outer portion of this flange no longer needs to be strong enough to withstand the forces applied in the prior push-type spring brake actuators by the power spring and the parking brake release pressure.

In comparison to an example of an existing push-type spring brake actuator, an EverSure® T30/30-3" spring brake actuator available from Bendix Spicer Foundation Brake LLC, Elyria, Ohio, the inventive pull-type spring brake actuator provides a greater than 10% reduction in actuator weight (16.7 lb. vs. 19 lb.), a greater than 25% improvement in reduction of distance of the center of mass from the mounting flange (3.9" vs. 5.4"), a greater than 10% reduction in the number of parts (31 vs. 36), and a substantial reduction in both material and manufacturing costs.

Other objects, advantages and novel features of the present invention will become apparent from the following detailed description of the invention when considered in conjunction with the accompanying drawings.

DETAILED DESCRIPTION OF THE DRAWINGS

Figure 1:
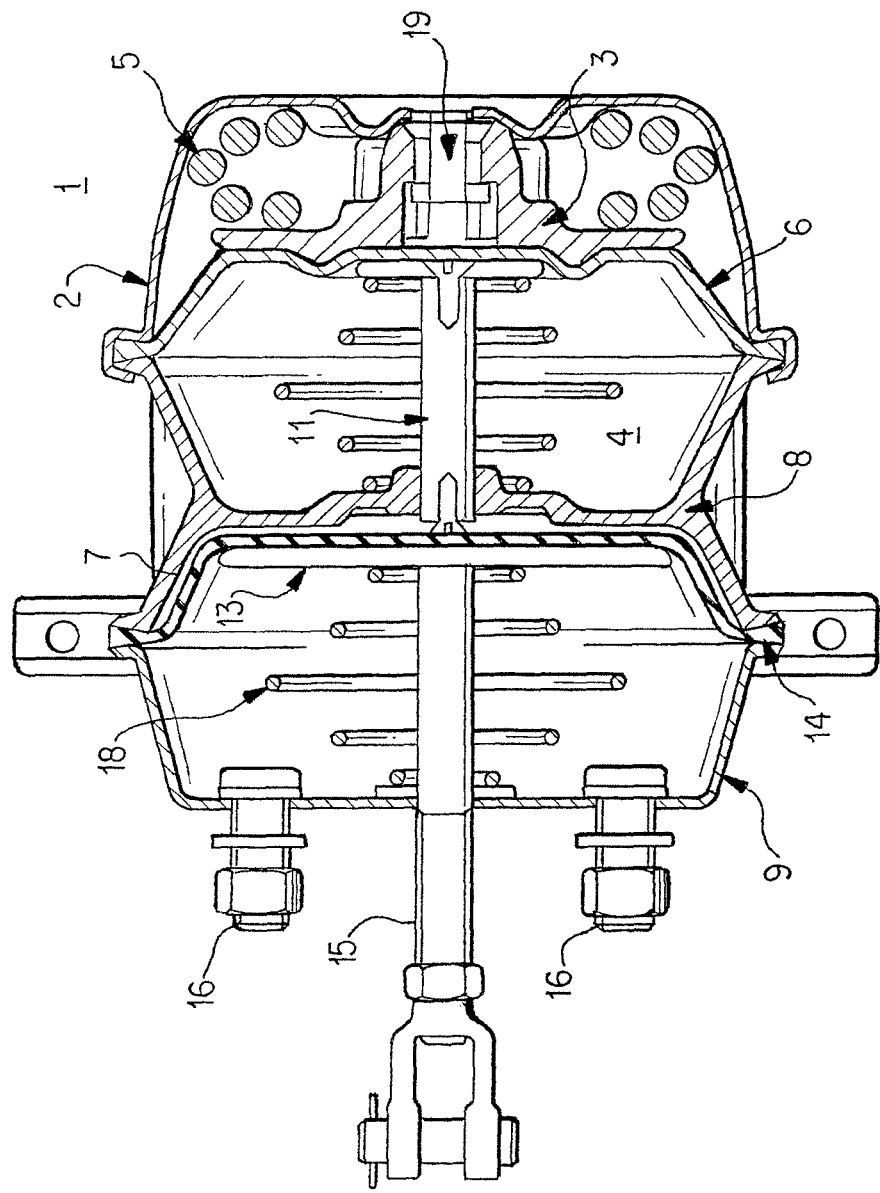
FIG. 1 is a cross-section view of an example of a previously known push-type spring brake actuator.
Figure 2:
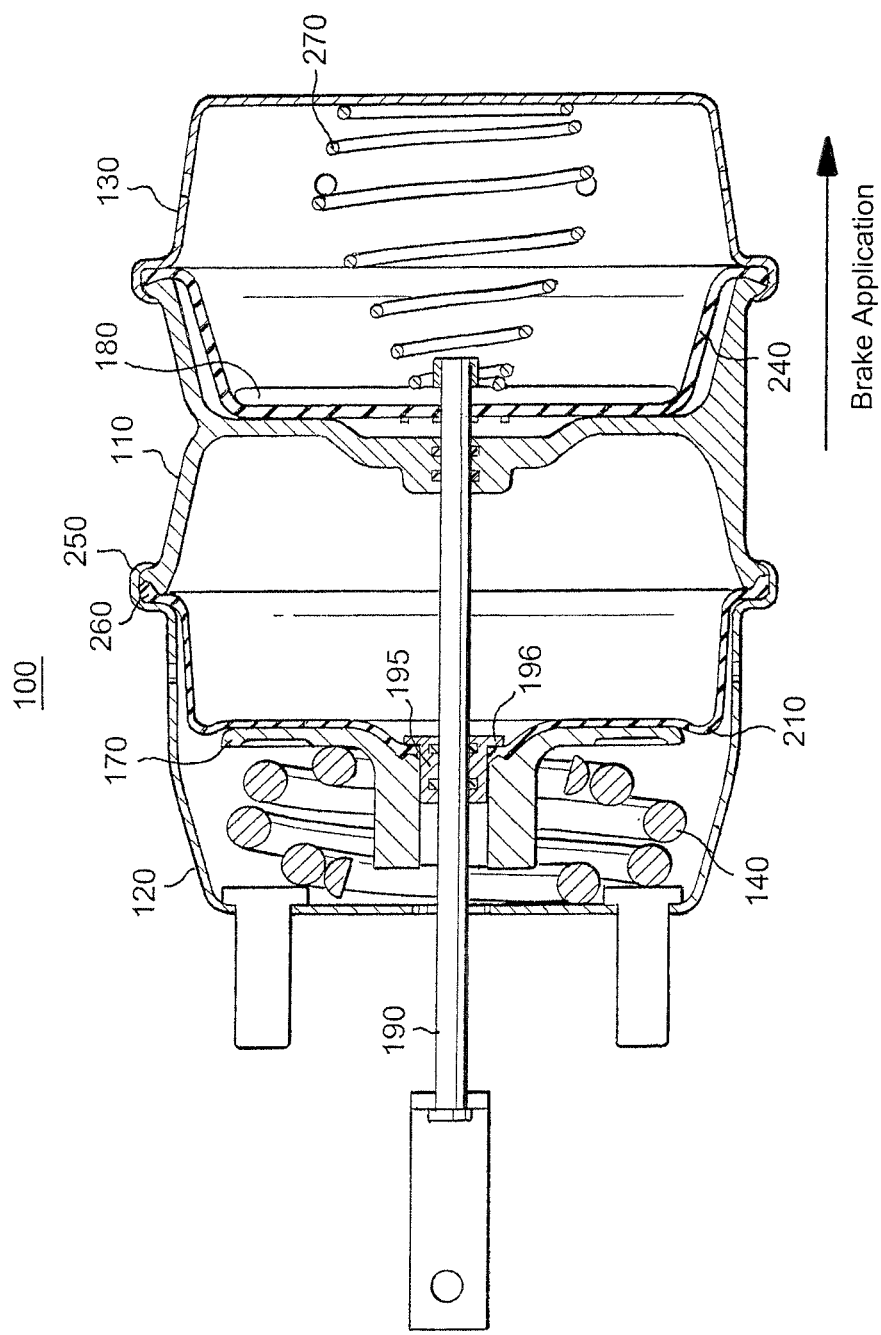
FIG. 2 is a cross-section view of an embodiment of a pull-type spring brake actuator in accordance with the present invention.

FIG. 2 is a cross-section view of a pull-type spring brake actuator 100 in accordance with a first embodiment of the present invention.

The actuator housing comprises an intermediate flange 110, front parking brake housing portion 120 containing a parking brake piston 170 at a vehicle brake end of spring brake actuator 100, and rear service brake housing portion 130 containing a service brake piston 180 on the opposite side of intermediate flange 110. The terms "front" and "rear" as used herein describe the directions facing toward and facing away, respectively, a vehicle brake to which the actuator 100 is to be mounted. Thus, in FIG. 2, "front" is the direction toward the left side of the figure, and "rear" is the direction toward the right side of the figure.

The operating elements of spring brake actuator 100 include a brake actuator spring 140, which has one end resting on an inside front face of the parking brake housing 120, and an opposite end resting on a front-facing side of a parking brake piston 170. It is to be understood that the present invention is not limited to a coil spring, but includes any member which provides the energy storage and return function required by a parking brake actuator. For example, alternative spring configurations, including multiple coil springs, leaf springs, cantilevered springs, etc., and alternative elements such as resilient blocks or chargeable high pressure bladders, are within the scope of the present invention.

The parking brake piston 170 in this embodiment cooperates with a parking brake release diaphragm 210 and the brake application operating rod 190 to provide the parking brake function, applying and releasing the parking brake as fluid pressure (in this embodiment, pneumatic pressure) is added or removed from the parking brake release pressure space defined by the diaphragm 210 and intermediate flange 110. The operating rod 190 connected to an operating member of the brake, such as a lever arranged to be rotated by an S-cam in a drum brake (not illustrated).

An outer rim portion 260 of the parking brake diaphragm is captured between a rear edge of the parking brake housing portion 120 and a front-facing rim of the intermediate flange 110, with a bead flange 250 of the parking brake housing 120 cooperating with a corresponding bead of intermediate flange 110 to capture the diaphragm outer rim portion 260 therebetween. In order to minimize manufacturing and material costs, the bead flange 250 in this embodiment is rolled over and crimped to secure the parking brake housing 120 to intermediate flange 110. Alternatively, a joint, such as a clamping ring, may be provided if the capability to remove the spring housing 150 is desired, for example to enable replacement of a diaphragm or an internal seal.

The operating rod 190 in this embodiment passes through a central region of the parking brake piston 170, with a flange member 195 fixed on the rod. Preferably the operating rod 190 is a solid rod through both housing portions. Because the operating rod in the present invention is primarily loaded in tension rather than compression as in conventional push-type actuators, the operating rod need not be sized to withstand high buckling loads, and therefore may be a smaller diameter and/or lighter weight operating rod.

The flange member 195 is configured to cooperate with the parking brake piston 170 such that: (i) when the parking brake piston is fully withdrawn in the parking brake released position as shown in FIG. 2, the operating rod 190 and flange member 195 are free to move toward the rear of the actuator when pulled by the service brake piston 180; and (ii) when the parking brake piston 170 moves in the brake application direction toward the rear of the actuator (indicated by the arrow in FIG. 2) and the flange member 195 meets the piston, the parking brake piston 170 displaces the brake application operating rod 190 in the brake application direction. In this embodiment, the flange member 195 has a laterally-extending flange 196 that meets (via the center region of the parking brake diaphragm 210) the center region of the piston 170 as the piston advances in the brake application direction. The parking brake piston 170 may engage the operating rod flange member 195 at any position before or at the location the parking brake is fully applied (i.e., at the position that which the parking brake piston is adjacent to the intermediate flange 110). The point of engagement in most cases will be defined by the distance the service brake piston has drawn the operating rod into the actuator.

In the FIG. 2 embodiment the parking brake piston 170 engages the operating rod 190 via the flange member 195, however, the present invention is not limited to this specific arrangement. The operating rod must be able to be pulled into the actuator by the service brake piston while the parking brake piston is being held in its parking brake released position, while also being capable of being moved in the brake application direction by the parking brake piston as this piston moves into the parking brake applied position. Thus, any mechanical arrangement which accomplishes these objectives is within the scope of the present invention. For example, instead of a separate flange member component, an integrally-formed annular ridge located at an intermediate position on the operating rod would function in the same manner as the flange member 195 in the present embodiment. Alternatively, a flange member on the parking brake piston or the parking brake piston itself may contact an element such as an annular collar 197 (shown in FIG. 3) axially fixed on the operating rod.

The rear service brake housing portion 130 also includes a service brake diaphragm 240 that is captured at its outer rim between a bead flange of the service brake housing portion 130 and a corresponding bead of intermediate flange 110. As shown in the FIG. 2 embodiment, because the service brake housing portion 130 sees only low forces in this pull-type spring brake actuator arrangement (primarily from the relatively small biasing force of service brake piston return spring 270) the housing portion 130 may be formed from a thin and light material, such as a thin metal stamping. FIG. 2 illustrates the service brake piston 180 in the brake release position, adjacent to the rear face of the intermediate flange 110.

FIG. 2 also illustrates the location of the operating rod flange member 195 on the brake application operating rod 190 at a distance from the service brake piston 180 that permits the service brake piston 180 to be in the brake fully released position when the parking brake piston 170 is fully withdrawn to its parking brake release position, while the height of the service brake housing portion 130 in the brake application direction is at least as high as necessary to permit the parking brake piston 170 to advance to a parking brake fully applied position when the parking brake pressure chamber is fully exhausted to atmosphere.

Figure 3:
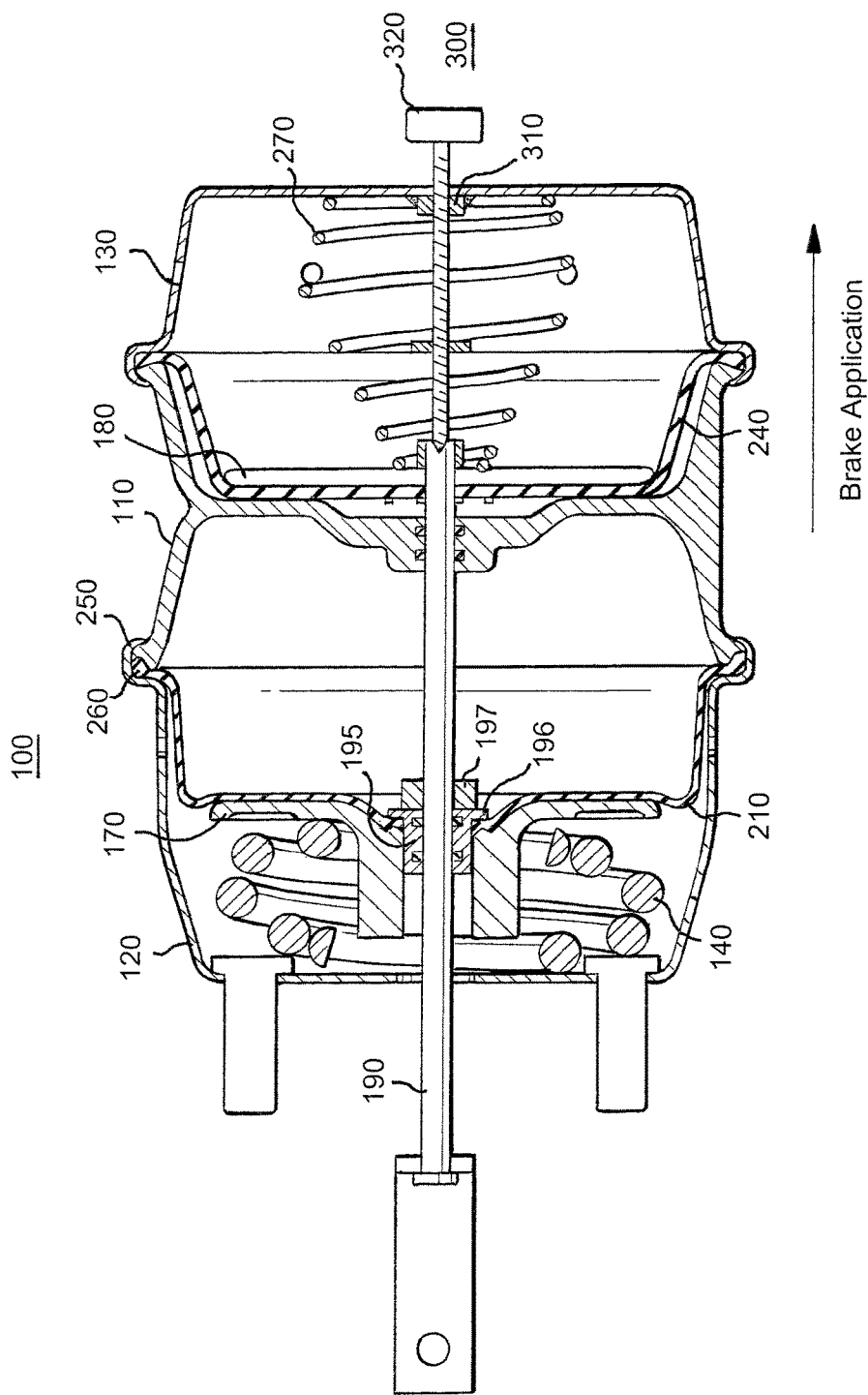
FIG. 3 is a cross-section view of another embodiment of a pull-type spring brake actuator in accordance with the present invention.
Figure 4:
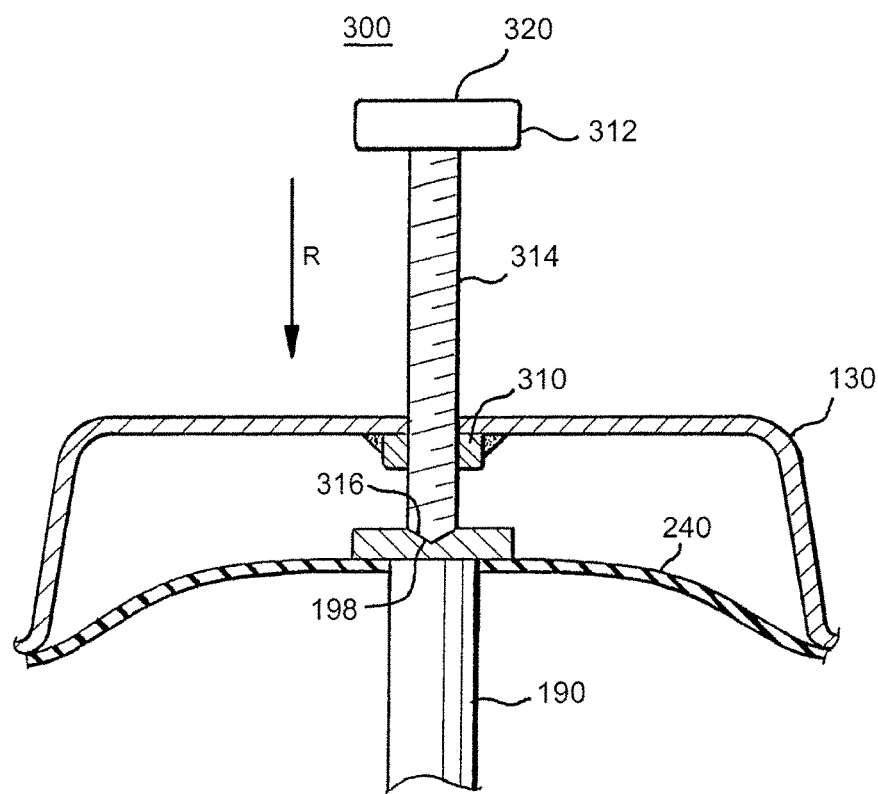
FIG. 4 is a cross-section view of the brake actuator release device of the FIG. 3 embodiment.

FIG. 3 is a cross-section view of another embodiment of pull-type spring brake actuator 100, in which there are shown an element 197 that acts as a parking brake piston engagement stop, and a device 300 for release of the pull-type spring brake actuator from a position external to the actuator housing. FIG. 4 is a cross-section view of the example release device arrangement in FIG. 3.

The release device 300 includes a fixed member on the rear service brake housing portion 130 (in this embodiment a threaded collar in the form of a nut 310 welded to an inner surface of the housing portion 130), and a cooperating release member 320 (in this embodiment a threaded bolt having a head portion 312 and a threaded shank 314 passing through threaded nut 310). The fixed member 310 is not limited to mounting on the inner surface of the rear service brake housing portion 130, but may be located elsewhere (such as on the outside of the housing 130) as long as the fixed member 310 can guide release member 320 into engagement with the end of operating rod 190.

Preferably, the release member includes a locating feature at its operating rod end to cooperate with the operating rod to provide secure engagement with the rod. In the embodiment in FIGS. 3 and 4, a tapered end surface 316 of the bolt shank 314 engages a corresponding centering recess 198 on the end of the operating rod 190. These engagement arrangements are not limiting, as any arrangement which assists in preventing lateral disengagement of the release device from the operating rod would be sufficient to provide the functionality of the tapered end surface 316/tapered recess 198 interaction would be within the scope of the present invention. For example, a projecting surface may be provided on the end of the operating rod that sets against a recess in the end of the release member, the end of the operating rod may be provided with a cup-shaped pocket into which the end of the release member is inserted. Similarly, the specific configuration of the ends is not limited. For example, rather than a pair of cooperating tapered features, a ball-and-socket arrangement may be used.

In operation, a brake equipped with the present pull-type spring brake actuator may be released from a brake-applied position (for example, when pneumatic operating pressure is not available and it is desired to move the vehicle) by operating the release device 300 to push the operating rod 190 in the brake release direction shown by the arrow R in FIG. 4. For example, the bolt head 312 may be engaged by a tool to rotate the threaded shank into the fixed nut 310 to advance the shank 314 toward the end of the operating rod 190, thereby advancing the operating rod and compressing the power spring 140 to release the brake.

The foregoing disclosure has been set forth merely to illustrate the invention and is not intended to be limiting. Because other such modifications of the disclosed embodiments incorporating the spirit and substance of the invention may occur to persons skilled in the art, the invention should be construed to include everything within the scope of the appended claims and equivalents thereof.

What is claimed is:

1. A spring brake actuator, comprising:
   an intermediate flange;
   a parking brake housing portion affixed at a flange end to a first side of the intermediate flange, the parking brake housing portion having a mounting end opposite the flange end and having a parking brake piston and a power spring disposed therein with the power spring between the mounting end and the parking brake piston;
   a service brake housing portion affixed to a second side of the intermediate flange opposite the first side and having a service brake piston arranged therein; and
   a brake application operating rod, wherein the operating rod
      at a first rod end is connected to the service brake piston and at a second rod end is configured for attachment to a component of a vehicle brake,
      extends through the intermediate flange and through the mounting end with the second rod end located outside of the parking brake housing portion,
      is displaceable when the parking brake piston is located at a parking brake release position that is adjacent to the mounting end in a brake application direction along which the second rod end is drawn toward the intermediate flange, and
      is biased by the parking brake piston in the brake application direction when the parking brake piston is located at a parking brake application position adjacent to the intermediate flange.

2. The spring brake actuator of claim 1, wherein
the operating rod includes a flange member arranged on the operating rod between the parking brake piston and the intermediate flange.

3. The spring brake actuator of claim 2, wherein
the flange member is axially fixed on the operating rod, and
the flange member is configured to cooperate with the parking brake piston to move the operating rod in the brake application direction.

4. The spring brake actuator of claim 3, further comprising:
a spring brake release device having a fixed member arranged on the service brake housing portion arranged to cooperate with a release member configured to displace the operating rod in a brake release direction away from the service brake housing portion.

5. The spring brake actuator of claim 4, wherein
the fixed member is a threaded collar and the release member is a threaded bolt.

6. The spring brake actuator of claim 4, wherein
the release member includes a locating feature at an operating rod end of the release member configured to cooperate with a corresponding feature of the operating rod to inhibit lateral motion of the ends of release member and the operating rod relative to one another during operation of the release member.

7. The spring brake actuator of claim 6, wherein
the release member a locating feature and the corresponding feature of the operating rod are cooperating tapered surfaces.

* * * * *